United States Patent [19]

Shiozawa et al.

[11] 3,827,126
[45] Aug. 6, 1974

[54] BENT PIPE ASSEMBLING APPARATUS
[75] Inventors: Kaoru Shiozawa; Tsugio Shirato; Kiyoshi Hirose, all of Chiba, Japan
[73] Assignee: Mitsui Shipbuilding and Engineering Co., Ltd., Tokyo, Japan
[22] Filed: Mar. 28, 1973
[21] Appl. No.: 345,676

[30] Foreign Application Priority Data
Apr. 7, 1972 Japan.............................. 47-35588

[52] U.S. Cl..................... 29/200 P, 269/45, 228/49
[51] Int. Cl........................................... B23k 37/04
[58] Field of Search................ 29/200 P, 282, 237; 214/1 P; 269/45, 55, 56, 61, 71; 228/4, 6, 47–49

[56] References Cited
UNITED STATES PATENTS
842,007  1/1907  Parker................................ 269/45
3,210,980  10/1965  Sengel............................. 228/49 X
3,239,209  3/1966  Kucka.............................. 228/48 X
3,772,753  11/1973  Sargeant.......................... 29/200 P

*Primary Examiner*—Al Lawrence Smith
*Assistant Examiner*—Harold P. Smith, Jr.

[57] ABSTRACT

The bent pipe assembling apparatus of the present invention comprises two straight pipe positioning means and one elbow supporting table disposed between said two means, one of said two means being capable of rotating about said elbow supporting table, so that the bent pipe having accurate dimensions in the length and the angle of bending may be easily produced.

6 Claims, 4 Drawing Figures

BENT PIPE ASSEMBLING APPARATUS

The present invention relates to a bent pipe assembling apparatus which is used in producing the bent pipe by connecting two straight pipes through an elbow placed therebetween.

In assembling an elbow-joined bent pipe heretofore, such laborious workings have been involved as marking a shape of the bent pipe to be assembled on a surface plate, hoisting straight pipe and an elbow in registration with the marked shape by hoisting machine such as a crane and joining the individual pipe elements sequentially while holding them. Further, in centering and positioning workings there have been many parts which resort to experience and intuition. Therefore, in conventional workings the time period for preparations has been long, the efficiency has been low and the dimensional accuracy of the complished products also have been low.

A principal object of the present invention is to provide a bent pipe assembling apparatus which is capable of assembling a bent pipe efficiently and raising the dimensional accuracy of the finished product.

Another object of the present invention is to provide a bent pipe assembling apparatus comprising an elbow supporting table for supporting the elbow in the predetermined position, a first straight pipe positioning means extending horizontally from the position adjacent said elbow supporting table for supporting the elbow in the predetermined position, a first straight pipe positioning means including a track means extending horizontally from the position adjacent said elbow supporting table and a truck movable on said track means and capable of supporting one straight pipe in the predetermined position, and a second straight pipe positioning means including a track means extending horizontally from the position adjacent said elbow supporting table and being rotatable about said elbow supporting table and a truck movable on said track means and capable of supporting another straight pipe.

Still further objects of the present invention will be clear by the following description.

An embodiment of the present invention is explained hereinafter referring to accompanying drawings in which.

Figure 1:
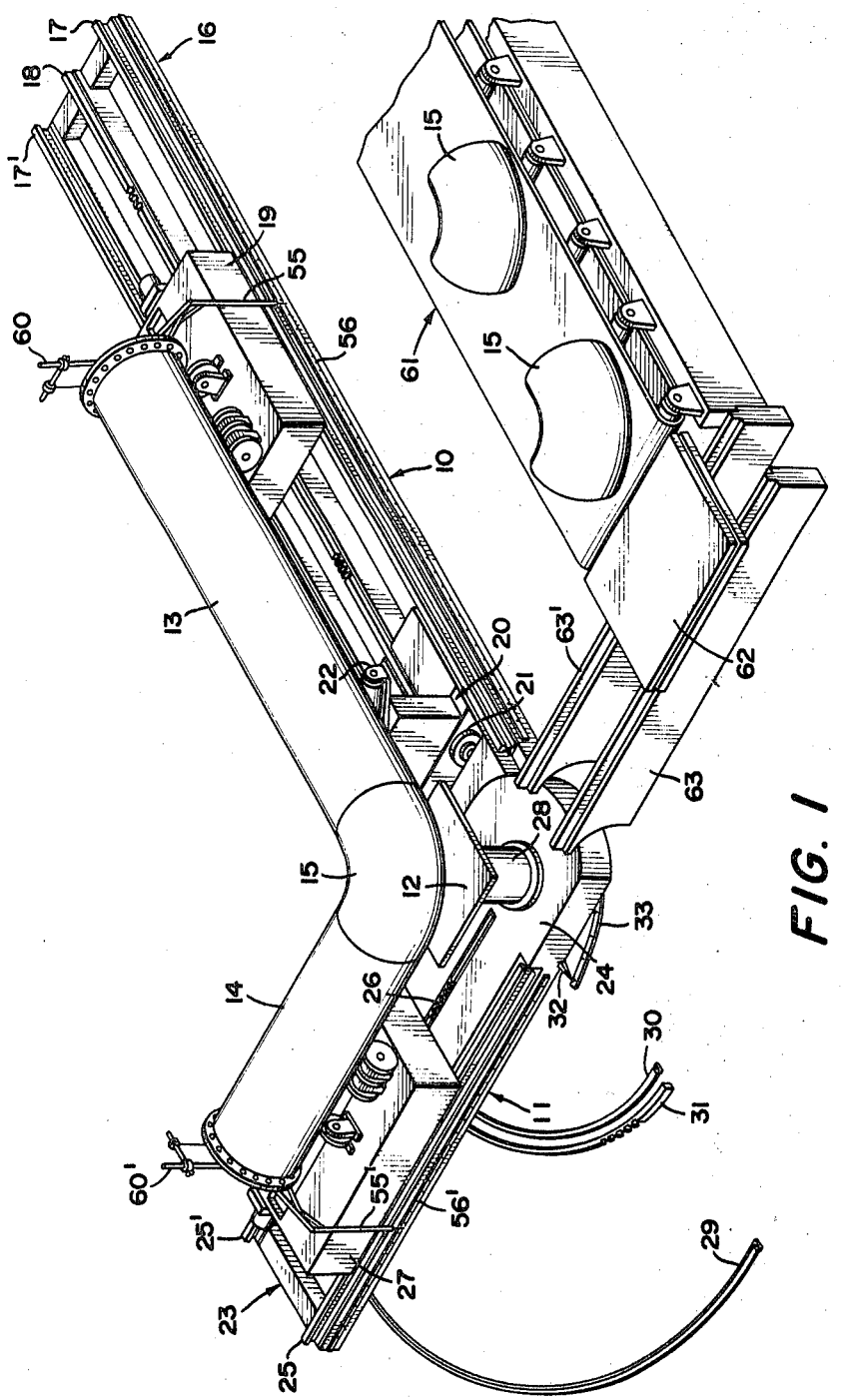
FIG. 1 is a perspective view showing the bent pipe assembling apparatus according to the present invention.
Figure 4:
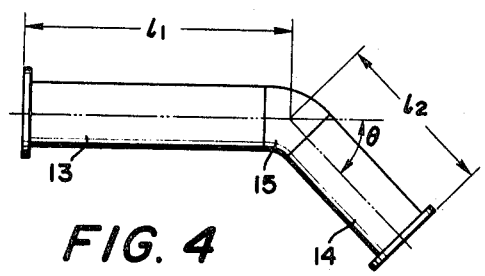
FIG. 4 is a diagrammatic view for explaining the dimensions of the respective pipe element of the bent pipe.

In FIG. 1 the bent pipe assembling apparatus according to the present invention is shown and said apparatus is an embodiment for assembling a straight pipe 13 having a long dimension $l_1$ and another straight pipe 14 having a short dimension $l_2$ through an elbow 15 disposed therebetween at an angle of $\theta$ shown in FIG. 4. Of course, the present invention is not limited to this embodiment. The apparatus according to the present invention can be used for assembling two straight pipes having the same dimension in a length through an elbow disposed therebetween.

As shown in FIG. 1, the bent pipe assembling apparatus comprises a first straight pipe positioning means generally indicated with a numeral reference 10, a second straight pipe positioning means generally indicated with a numeral reference 11 and an elbow supporting table 12.

The first straight pipe positioning means 10 has a first track means 16 extending in a horizontal direction and including a pair of rails 17 and 17' parallel to each other. The one end of the each rail terminates the position adjacent the elbow supporting table 12. Between these rails 17 and 17' a rack 18 extending in parallel to said rails 17 and 17' is mounted. A truck 19 for supporting the outer end portion of the pipe 13 is movably mounted on the rails 17 and 17'. The truck 19 has a pinion (not shown) of a suitable driving means disposed therein. When the pinion is meshed the rack 18 and rotated by the driving means, the truck 19 moves along the rails 17 and 17'.

The first track means 16 has a roller means 20 at its end portion adjacent the elbow supporting table 12. On this roller means 20, a pair of rotary rollers 21 (one roller is not shown) and a pair of feeding rollers 22 (one roller is not shown) are disposed. The rollers 21 and 22 can be moved upward and downward respectively by hydraulic devices (not shown), and further they can support the connecting end of pipe 13 at the position where said end of the pipe 13 is placed in the predetermined position. The feeding rollers 22 guide the straight pipe 13 to move it in the longitudinal direction.

The second straight pipe positioning means 11 has a second track means 23 disposed on the same plane as the first track means 16 of the first straight pipe positioning means 10 so as to intersect said first track means 16. The second track means 23 has a pair of rails 25 and 25' disposed in parallel to each other. A rack 26 is mounted between the rails 25 and 25' on the second track means 23. A truck 27 for supporting a short straight pipe 14 is movably mounted. The truck 27 comprises a pinion (not shown) of a suitable driving device, which pinion engages the rack 26. The truck 27 is moved along the rails 25 and 25' by the rotation of the pinion meshing with the rack 26.

A hydraulic cylinder 28 is disposed such that it passes through the end portion 24 of the second track means 23 adjacent the end of the first track means 16. The elbow supporting table 12 is secured to the end surface of the hydraulic cylinder 28. Accordingly, the elbow supporting table 12 can be moved upwards and downwards by the expansion and the contraction of the hydraulic cylinder 28.

The second track means 23 is provided with wheels (not shown) which run on rails 29 and 30 formed in arcuate shapes, and is further provided with a pinion (not shown) driven by a suitable driving device disposed within said means 23. The pinion is engaged with an arcuate rack 31. The center of curvature of the rails 29 and 30 and the rack 31 is coincident with the center of the elbow supporting table 12. When the pinion is rotated in meshing engagement with the rack 31, the second track means 23 is pivotally moved in a horizontal direction about the hydraulic cylinder 28 supporting the elbow supporting table 12. The rails 29 and 30 and the rack 31 are disposed on a suitable stationary portion or part such as a base portion (not shown) of the present apparatus. A circular protractor 33 is mounted on the base portion, of which center of curvature is coincident with the center of the elbow supporting table 12 (or the hydraulic cylinder 28). An index needle 32 is provided with the end portion 24 of the second track means 23. The quantity of angular movement of the second track means 23 can be known by the indication of the needle 32 to the scale of the circular protractor 33. The angle value indicated by the index needle 32 corresponds to the angle $\theta$ in FIG. 4.

The trucks 19 and 27 of the first and second straight pipe positioning means 10 and 11 are of substantially the same construction, so that the truck 19 of the first straight pipe positioning means 10 only will be described hereunder.

Figure 2:
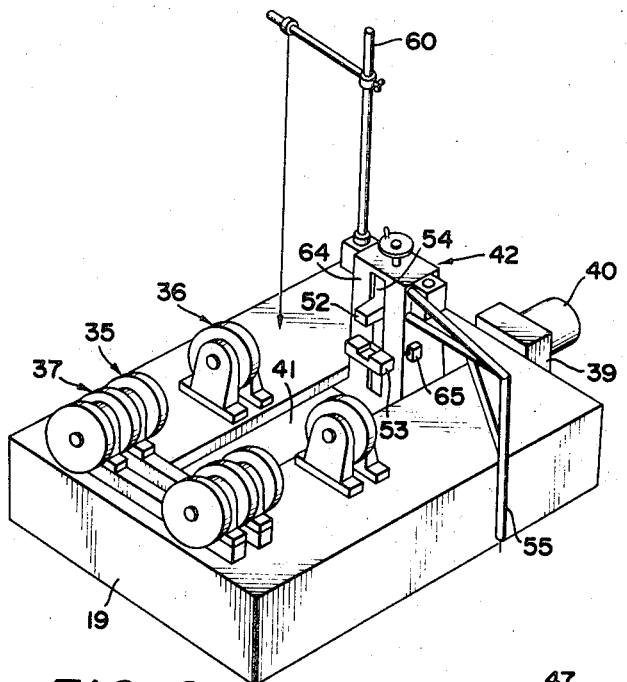
FIG. 2 is a perspective view showing the details of the truck shown in FIG. 1.
Figure 3:
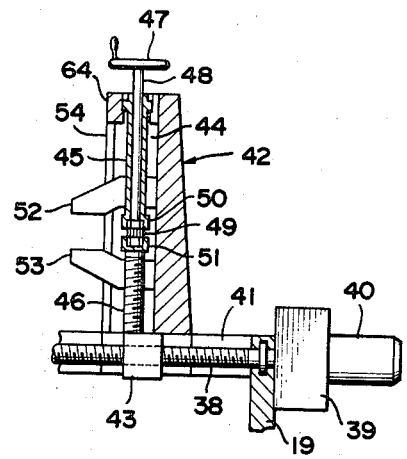
FIG. 3 is a sectional view of the chuck provided on the truck shown in FIG. 2.

Referring to FIGS. 2 and 3, the truck 19 is provided with a supporting means 35 on its upper surface. The supporting means 35 consists of a front roller group 36 and a rear roller group 37 and these rollers are freely rotatable about axes extending in parallel to the direction of movement of the truck 19. The straight pipe 13 is partially supported on these rollers as shown in FIG. 1.

A screw rod 38 is provided within a longitudinal slot 41 formed in the body portion of the truck 19 and is rotated by a motor 40 through a reduction gear device 39 mounted on the end wall of the body portion of truck 19. The truck 19 comprises a chuck 42 for determining a dimension thereon. The chuck 42 is provided with a nut 43 on the bottom surface thereof and said nut 43 is disposed slidably within the slot 41 and engaged the screw rod 38. Accordingly, when the screw rod 38 is rotated by the motor 40, the nut 43 is slided in the slot 41 so that the chuck 42 may be moved forwards and rearwards along the slot 41.

In the chuck 42, a vertical slot 44 is formed, in which two vertical screw rods 45 and 46 are rotatably disposed, respectively. These vertical screw rods 45 and 46 are arranged in alingment relation to each other and the lower end of the vertical screw rod 45 is faced the upper end of the other vertical screw rod 46 at a small interval therebetween. The vertical screw rod 45 is of a hollow shape, into which a shaft 48 is inserted rotatably in relation to the screw rod 45. The shaft 48 has a handle 47 by which the vertical screw rod 45 is manually rotated and has a spline portion 49 at its lower end normally engaged with a splined portion 51 formed at the upper end of the vertical screw rod 46. Accordingly, when the handle 47 is rotated, the screw rod 46 shall be rotated by engagement of the spline portion 49 to the spline portion 51. The shaft 48 can be moved upwards by lifting the handle 47 manually, because the shaft 48 can be moved relative to the hollow screw rod 45. This upward movement of the shaft 48 results engagement between the spline portions of 49 and 50. Accordingly, when the handle 47 is rotated in this engagement of the splined portion 49 with the splined portion 50, the hollow screw rod 45 will be rotated with the shaft 48.

Jaws 52 and 43 are disposed slidably upward and downward in the chuck 42 and threadably mounted on the screw rods 45 and 46, respectively. These jaws 52 and 53 project from the vertical slot 44 as shown FIGS. 2 and 3. The jaws 52 and 53 are moved upward or downward as the screw rods 45 and 46 are rotated.

In the chuck 42, an indicator 55 is attached projecting outside of the chuck 42 to determine the dimensions of the pipe 13. The indicator 55 cooperates to a measure scale 56 attached to the outside wall of the first track means 16 (FIG. 1) and shows the position of the truck 19.

On the upper surface of the body portion of the truck 19 is mounted a plumb-bob device 60 to determine the mating of the ends of the pipes to be assembled. This plumb-bob device 60 is well known and operated by manual handling.

A limit switch 65 for dienergizing the motor 40 is provided on the outside wall of the chuck 42. The switch 65 is so positioned that the end surface of the pipe 13 can contact with the switch 65 instantaneously when the end surface abuts against the end wall 64 of the chuck 42.

As shown in FIG. 1, a conveyor device 61 is provided in parallel to the first straight pipe positioning means 16 to transfer the elbow 15 to an elbow transporting truck 62. The outlet end of the conveyor device 61 is placed adjacent the elbow receiving end of rails 63 and 63'. The rails 63 and 63' are disposed in parallel to each other, of which the end opposite to the elbow receiving end reaches the position adjacent the elbow supporting table 12. The truck 62 can be moved on the rails 63 and 63' to receive the elbow to be supplied and transfer it to the supporting table 12.

In the operation of the bent pipe assembling apparatus according to the present invention, in the first place, the rotary rollers 21 of the roller means 20 are raised to the uppermost position of its vertical reciprocal stroke in the first straight pipe positioning means 10 and the truck 19 is moved to the suitable position. Then, the long pipe 13 is mounted on the rollers 36 and 37 of the supporting means 35 on the truck 19. This mounting of the long pipe 13 is carried out by use of a suitable lift machine (not shown) such as a crane or hoist. Then, while the rotary rollers 21 are rotated in the same direction by a driving power means (not shown) provided in the pipe positioning means 16, the ends of the pipe 13 are positioned at the predetermined position by using of the plumb-bob device 60. When the rollers 21 are rotated as described above, the condition can be detected that the plumb wire of the device 60 becomes parallel to the end surface of pipe 13. At this condition of the end surface, the ends of the pipe 13 will be in the predetermined position. And then, the motor 40 is energized, and thereby the chuck 42 is moved for the end surface of the pipe 13. The jaws 52 and 53 are inserted into the pipe 13 and the end surface of the pipe 13 contacts with the switch 65. As soon as the end surface of the pipe 13 contacts with the limit switch 65, the motor 40 is dienergized to stop the feeding due to the rotation of the screw rod 38. Thus, also the chuck 42 is stopped.

After the stopping of the chuck 42, the handle 47 is rotated manually to open the jaws 52 and 53 until they contact tightly with the inner surface of the pipe 13, and thereby the pipe 13 is fixed on the truck 19.

After the above operations have been completed, the feed rollers 22 are raised to engage the outer surface of the pipe 13 and the rotary rollers 21 are retracted to the lower original position as shown in FIG. 1. At this stage of the operation, the long pipe 13 becomes such status that the long pipe 13 is placed at the predetermined position.

At the above status of the pipe 13, the truck 19 is moved towards the elbow supporting table 12. During this travelling of the truck 19, when the indicator 55 indicates the reading on the scale 56 corresponding to the length $l_1$ shown in FIG. 4, the movement of the truck 19 is stopped.

Also at the second straight pipe positioning means 11, the short pipe 14 is mounted on the rollers of the second truck 27 same as the first truck 19 and is positioned at the predetermined condition as well as the operations in the first truck 19. The operations for the short pipe 14 on the second truck 27 is carried out by using the plumb-bob device 60', the indicator 55' and the scale 56' attached to the sidewall of the second track means 23. However, in the handling of the short pipe 14, the roller means 20 is not used, because as the pipe 14 is short, the pipe 14 can be supported sufficiently by supporting the intermediate portion only. If a long pipe is used instead of the short pipe 14, the roller means 20 will become necessary to support the connecting end of the pipe.

After the short pipe 14 has been positioned at the predetermined conditions, the second positioning means 11 are moved along the rails 29 and 30 about the hydraulic cylinder 28 until the indicator needle 32 indicates the predetermined angle corresponding to the angle $\theta$ shown in FIG. 4. Then the truck 27 is moved and it is stopped when the indicator 55' indicates the value on the scale 56' corresponding to the length $l_2$ (FIG. 4).

The truck 62 on which the elbow 15 is placed is moved towards the elbow supporting table 12 and the elbow 15 is transferred from the truck 62 onto the table 12. The table 12 is so adjusted by moving it that the opposite ends of the elbow 15 are respectively aligned to each connecting ends of the pipes 13 and 14. After the pipes 13, 14 and 15 have been aligned to one another, the end portions to be connected of the pipes are properly welded to accomplish the bent pipe.

As clear from the above descriptions, according to the present invention, the three values $l_1$, $l_2$ and $\theta$ expressing the shape of a bent pipe are preset, so that a high finishing accuracy can be obtained and each element pipes (straight pipes or elbow pipes etc.) are welding with they being fixedly set on the trucks or the supporting table, so that the welding operation will become easy.

We claim:
1. A bent pipe assembling apparatus comprising an elbow supporting table for supporting the elbow in a predetermined position, a first straight pipe positioning means including a track means extending horizontally from a position adjacent said elbow supporting table and a truck movable on said track means and capable of supporting one straight pipe in a predetermined position, and a second straight pipe positioning means including a track means extending horizontally from the position adjacent said elbow supporting table and being rotatable about said elbow supporting table and a truck movable on said track means and capable of supporting another straight pipe.

2. A bent pipe assembling apparatus according to claim 1, wherein one of the straight pipe positioning means comprises roller means for supporting the connecting end of a long straight pipe, said roller means having at least a pair of feeding rollers for feeding said long straight pipe towards the elbow supported on the elbow supporting table.

3. A bent pipe assembling apparatus according to claim 1, wherein a circular protractor for determining the angle between the straight pipes is mounted on a base portion of said apparatus and an indicator for said circular protector is provided on said rotatable straight pipe positioning means.

4. A bent pipe assembling apparatus according to claim 1, wherein said straight pipe positioning means are provided with scales for determining the longitudinal dimensions of straight pipes on said track means and indicators for said scales are provided on said trucks.

5. A bent pipe assembling apparatus according to claim 1, wherein the each truck is provided with a chuck for fixing the end of the straight pipe.

6. A bent pipe assembling apparatus comprising an elbow supporting table for supporting the elbow in a predetermined position; a first straight pipe positioning means including a track means extending horizontally from a position adjacent said elbow supporting table, a truck movable on said track means and capable of supporting one straight pipe in a predetermined position and a roller means having a pair of feeding rollers reciprocally movable in the vertical direction, said rollers supporting the connecting end of the straight pipe in the predetermined position for one end of the elbow at its uppermost position; a second straight pipe positioning means including a track means extending horizontally from a position adjacent said elbow supporting table and being rotatable about said elbow supporting table and a truck movable on said track means and capable of supporting another straight pipe; and a track consisting of a pair of parallel rails and each extending horizontally from a position adjacent said elbow supporting table, on which a truck for transferring the elbow towards said table is mounted.

* * * * *